219-121.    SR
06-15-71    OR    3,585,351

United States Patent

[11] 3,585,351

| [72] | Inventor | John F. Hinrichs |
| | | Menomonee Falls, Wis. |
| [21] | Appl. No. | 852,546 |
| [22] | Filed | Aug. 25, 1969 |
| [45] | Patented | June 15, 1971 |
| [73] | Assignee | A. O. Smith Corporation |
| | | Milwaukee, Wis. |

[54] ELECTRON BEAM WELDING PROCESS AND APPARATUS
6 Claims, 6 Drawing Figs.

[52] U.S. Cl. ................................................. 219/121, 219/137
[51] Int. Cl. .................................................. B23k 15/00
[50] Field of Search ........................................ 219/61, 62, 137, 121, 121 EB

[56] References Cited
UNITED STATES PATENTS

| 2,905,805 | 9/1969 | McElrath ................ | 219/137 |
| 2,987,610 | 6/1961 | Steigerwald ............ | 219/117 |
| 3,385,948 | 4/1968 | Redmond ................ | 219/106 |
| 3,437,787 | 4/1969 | Chyle ..................... | 219/137 |

Primary Examiner—J. V. Truhe
Assistant Examiner—R. E. O'Neill
Attorney—Andrus, Sceales, Starke and Sawall ABSTRACT: A tubular metal blank having two longitudinally opposed edges welded to form a seam by a process and apparatus therefor including heating the edges to a welding temperature at a first station and pressing the edges together at the first station to initially weld the edges thereof and provide extruded metal outwardly of the seam provided by the weld. Then the weld seam and extruded metal is electron beam welded at a second station with the initial weld being refined by the electron beam welding and undercutting in the weld being prevented by the formation of the extruded metal from the weld area. Additional metal may be added prior to the electron beam welding station to provide additional material at the weld seam to overcome the problem of undercutting.

PATENTED JUN 15 1971

Inventor
John F. Hinrichs
By
Andrus, Sceales, Starke & Sawall
Attorneys

Inventor
John F. Hinrichs
By Andrus, Sceales, Starke, & Sawall
Attorneys

ELECTRON BEAM WELDING PROCESS AND APPARATUS

This invention relates to welding processes and more particularly to welding together edges of metal blanks by electron beam welding.

BACKGROUND OF THE INVENTION

Electron beam welding, such as that in accordance with the principles and apparatus discussed in *Welding Handbook*, (edited by Arthur L. Phillips, Am. Welding Soc.), is advantageously rapid and usually results in higher quality welds than other presently known processes for welding of metal articles. The ease and speed of electron beam welding would be particularly helpful in the manufacture of elongated metal seams such as in line pipe and the like which is often formed in 40-foot lengths or more from tubular blanks of a suitable carbon steel. In some pipe manufacturing processes, a coiled blank is continuously formed into a tubular blank by a forming mill and therefore, continuous seams are welded. Electron beam welding also overcomes the fiber bend-out problem which is present in the well-known heat and pressure welding processes.

On the other hand, electron beam welding has not been developed to full advantage in possible applications such as pipe seam welding due mainly to the phenomena known as undercutting. Undercutting causes grooves along the exposed edges of the weld, which results from the very rapid melting and very rapid freezing of molten metal before the seam is completely filled to the edges. Thus, if the beam moves too fast, the molten metal may freeze before filling the gap between the edges being welded, causing an undercut. Consequently, the problem has been attacked by limiting the beam's speed of travel along the seam. However, with that method, undercutting is not fully eliminated, and the advantageous rapidity of electron beam welding is lessened.

The impurities in steels cause further difficulties in electron beam welding. As a beam travels along a weld edge, the impurities, as well as some metal, vaporize causing turbulence as the vapor seeks to escape. Sometimes, especially with a fast traveling electron beam, the metal will freeze before the vapor bubbles escape and flaws will result in the weld. Again, present thought has been to partially solve the problem by decreasing the speed of beam travel, so that vaporization of the impurities is completed before freezing of the weld.

The thickness of the metal pieces to be welded, the length of the welds and the desired increase in work speeds also present problems for electron beam welding.

SUMMARY OF THE INVENTION

The invention provides a solution to the above problems and has other advantages which will be apparent from the specification and drawings.

Instead of initially merely focusing a high energy beam such as an electron beam directly on the seam edges of metal blanks to weld them together, the edges are first heated to the range of fusing or welding temperatures and pressure is applied to the blank to force and fuse the seam edges together and at the same time extrude or upset metal outwardly of both the inside and outside surfaces of the weld seam. The pressure is sufficient to cause material to build up in the seam, and sufficient to accomplish joining of the seam edges.

The invention contemplates both: (1) developing a reinforcement or overflow of weld material at the weld seam from extruded metal by first heating and then pushing the edges together, or (2) developing reinforcement by adding reinforcement material as filler after the metal welding and prior to the electron beam welding step; the invention may also utilize various combinations of these two methods. Preferably the high energy beam is directed into the welded seam as it still retains heat from the initial welding operation to thereby accomplish the high energy beam welding of the metal blank.

For pipe welding and similar applications, the invention utilizes a welding apparatus which includes an electron beam gun and a prewelding unit. In the most advantageous application, the prewelding unit is a high frequency resistance welding unit with pincher rollers for applying the clamping force to the blank. The pipe blank moves relative to the welding apparatus and the rollers bring the seam edges to an apex as the blank passes a first station. At this station, the high frequency welding unit heats the edges to a plastic state at the area of the apex, and as the rollers are applied, a fusion of the seam results, extruding reinforcement material into a plastic upset on the inside and outside of the weld seam. The electron beam gun is disposed at a second station which is adjacent to the first station and along the seam in the pipe so that the electron beam can be applied while the weld seam is still at a high temperature from the initial weld. The electron beam welds into the upset at the seam.

This process provides sufficient extruded material reinforcement so that when the electron beam rewelds the seam any undercut is in the reinforcement rather than between the seam edges. Further, by rewelding into the already welded seam adverse fiber bend-out is avoided in the final weld.

Other features of the invention include the increased welding speeds accomplished, the fact that vapor turbulence in the actual welding is lessened by the heating and pressure application at the preweld station, and the fact that this heating and prewelding process permits weld impurities to escape more fully. The weld is relatively narrow and shrinkage stressing is thereby lessened.

The figures illustrate the best embodiments presently contemplated by the inventor.

DESCRIPTION

Figure 1:
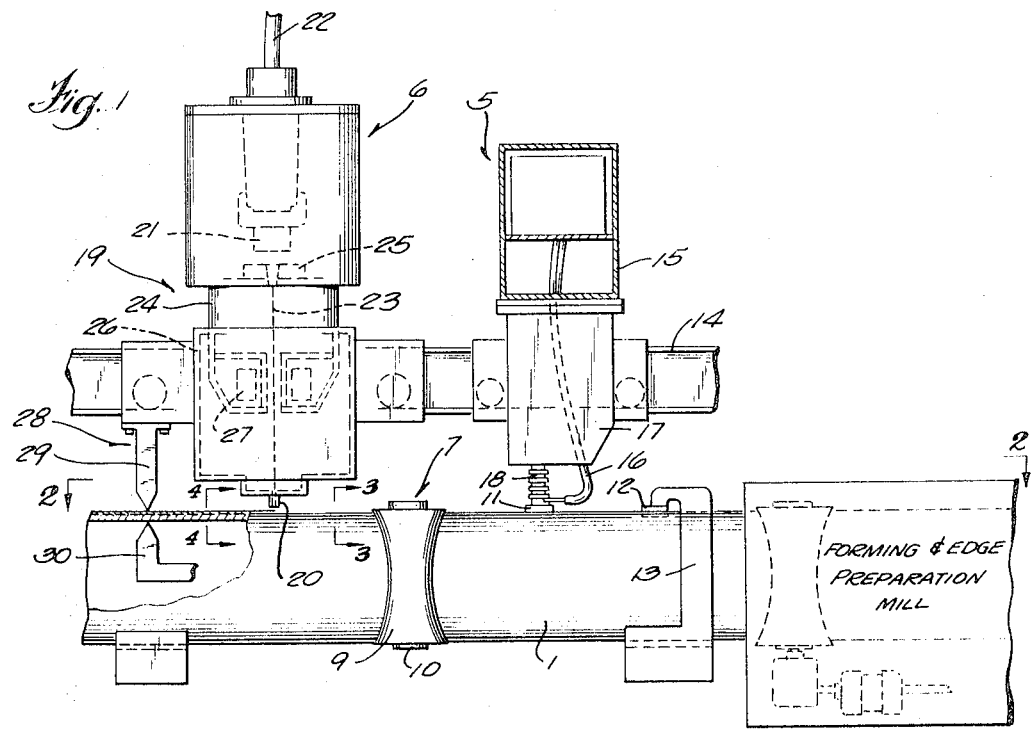
FIG. 1 is a side elevational view of the apparatus of the invention with accessory equipment being shown generally.
Figure 2:
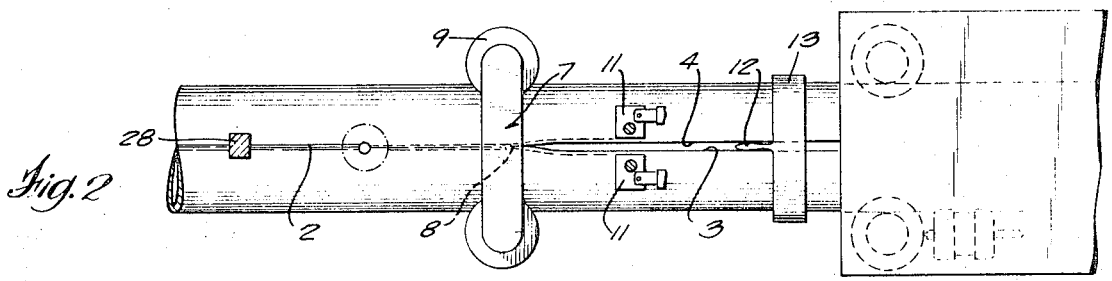
FIG. 2 is a top sectional view taken along lines 2-2 of FIG. 1.

In the drawings, a metal pipe blank 1 is formed into a pipe section with a seam weld 2 formed by a method and apparatus in accordance with the invention.

Pipe blank 1 may be supplied in tubular form by suitable rolling of a flat blank in a forming mill shown in part by the figures. The forming mill also drives the blank through the illustrated apparatus so that the adjacent longitudinal seam edges 3 and 4 are disposed on the top side of the blank. Supporting and pipe blank handling equipment is diagrammatically shown as a variety of constructions may be employed.

Pipe blank 1 is shown suitably supported for movement of the adjacent edge 3 and 4 relative to a prewelding unit 5 and an electron beam welding unit 6.

Unit 5 is a heat and pressure welding unit and in accordance with a particular novel aspect of the invention, a high frequency heating unit which may be constructed in accordance with the known high frequency welding assemblies. Generally, the prewelding unit includes a pinch roller assembly 7 for establishing a precise convergence of edges 3 and 4 from a slightly spaced arrangement. Roller assembly 7 brings edges 3 and 4 into engagement at a precisely located point or apex 8. For this purpose, the assembly has a pair of rollers 9 mounted for rotation on suitable shafts. In turn, the roller shafts are secured to the floor and may have crossmembers 10 which serve to maintain the proper pressure across the walls of blank 1.

High frequency heating electrodes 11 are located to slidably contact pipe blank 1 at small areas on the pipe circumference adjacent edges 3 and 4 and in spaced relation to apex 8. The original spacing of the edges is generally established by a suitable spacer member 12 which is located between the opposed edges. Spacer 12 may be of any suitable construction and is attached to support structure, such as to a guide shoe 13 through which blank 1 passes. Together, spacer 12, shoe 13 and roller assembly 7 represent suitable structure to accomplish the proper convergence of edges 3 and 4.

Parts of the welding assembly are supported by a frame 14 which is supported on the floor as by a number of base beams, not shown, attached to members of the frame.

Preweld unit 5 has a high frequency power unit 15 with a rating suitable for resistance welding processes. Power unit 15 is supported on frame 14 above blank 1 and is connected to electrodes 11 by lead cables 16, around which a depending shield 17 extends to terminate above seam edges 3 and 4. Insulated electrode support members 18 are provided for the pair of sliding electrode contacts 11 and are attached to the shield 17 to properly locate the electrodes adjacent the edges 3 or 4.

Energizing of unit 15 produces a high frequency current from the one electrode 11 along edge 3, across apex 8, and along edge 4 to the opposite electrode. As current flows, electrical resistance causes high temperatures on edges 3 and 4 at apex 8.

The characteristics of the apex, the distance of the apex from contacts 11 and the other variables are determined in the fashion known in high frequency resistance welding. For the invention, power should be sufficient to quickly heat the area of blank 1 at apex 8 to welding temperatures.

Figure 3:
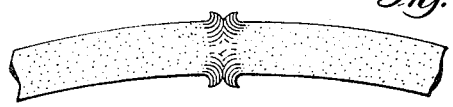
FIG. 3 is an enlarged partial section taken at lines 3-3 of FIG. 1.

As the edges are thus prepared, pressure is applied at apex 8 across the pipe blank by roller assembly 7. Sufficient pressure is applied so that the plastic edges 3 and 4 will engage and extrude portions of molten or near molten metal outwardly of the engaged edges to provide reinforcement material upset, which is material from the edges that overflows the edges on both the outside and inside parts of the seam. FIG. 3 illustrates the general character of the partially fused pipe seam after the apex 8.

Pinch roller assembly 7 applies as much pressure as needed to join the seam edges and to provide a moderate upset of reinforcement metal at the seam. The proper pressure is generally determined by the plastic state of the edges after resistance heating and such other factors as may affect the character of the upset. In accordance with the invention, however, sufficient reinforcement material is preferably provided so that any undercutting by electron beam unit 6 for the desired welding speed will appear in the reinforcement material rather than in the weld joining the edges 3 and 4.

Summarizing, pipe blank 1 continually passes underneath the seam preparing station, referring to the combination of the prewelding apparatus including unit 15, contacts 11 and roller assembly 7. There, the blank is welded and an upset of metal in the plastic state is extruded from the opposite surfaces of the seam provided by the initial welding of edges 3 and 4. From this first station, pipe blank 1 continues to a second, high energy beam welding station, or electron beam unit 6, which is positioned to reweld the seam to finally join edges 3 and 4 together. The invention contemplates that the high energy beam weld is most advantageously and rapidly accomplished while the seam remains heated and in the plastic state. The molten material will not tend to freeze before filling in between edges 3 and 4, when the beam welds into the hot seam. As well, the electron beam can better to boil out impurities from the molten material.

Electron beam unit 6 is illustrated generally as a nonvacuum electron beam welder of any suitable known construction. For application other than pipe fabrication, it may be necessary to employ a high vacuum or medium vacuum unit because the electron beam unit cannot be positioned close enough to the weld. In the example of the invention illustrated in the drawings, the electron beam unit has a gun 19 with the usual electron beam source, anode, focusing lens and a beam exit orifice 20 which is positioned closely over the seam.

Referring particularly to FIG. 1, which shows a generally schematic drawing of electron beam gun 19, a cathode source 21 being fed by a high voltage cable and receptacle 22, establishes an electron beam 23 in a vacuum enclosure 24. The cathode to anode voltage provides the accelerating potential for the beam, which is focused through small openings in a pressure staging enclosure 26 by a magnetic lens 27, finally to impinge on the workpiece through exit orifice 20.

Figure 4:
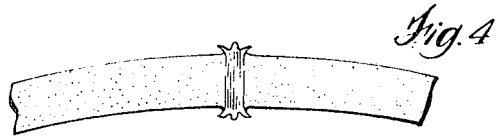
FIG. 4 is an enlarged partial section taken at lines 4-4 of FIG. 1.

The beam welds within the initially fused seam to weld the seam so that fiber bend-out is substantially eliminated and any undercut is in the reinforcement, as shown in FIG. 4. Since the seam is already at a high temperature and plastic, the electron beam will expend less energy in forming the weld and consequently, the pipe blanks 1 can be driven through the respective stations at a faster rate. But since the seam preparing station provides reinforcement or upset material at the inside and outside surfaces of the initial weld, this increased rate will not result in undercutting along the seam. For a given prewelding seam temperature, the distance between apex 8 and beam electron exit orifice 20 and the rate of travel by the blank, determine the plastic condition of the reinforcement upset as it becomes aligned with the welding station. When the seam is near the welding temperature as the beam tunnels into the seam, the welding speed can be at a maximum. Thus, the distance should be short or in the order of a foot to 4 feet, as must be determined in connection with the structural requirements of the specific equipment being used.

The finished weld will have considerable extruded reinforcement material extended above and below the seam, as shown in FIG. 4. Such excess is preferably trimmed off.

For purposes of trimming, a hot trim apparatus 28 is positioned at the seams just beyond the electron beam welding station 6. Shown generally in FIG. 1, any suitable apparatus may be employed and has an outer diameter tool 29 and an inner diameter tool 30 both suitably supported so that they trim a portion of the excess off of both sides of the seam. Tool 30 may be supported within the pipe in the usual manner of back up devices as by a cantilever arm, while tool 29 is attached to a frame member 14.

MODIFICATIONS OF THE INVENTION

Figure 5:
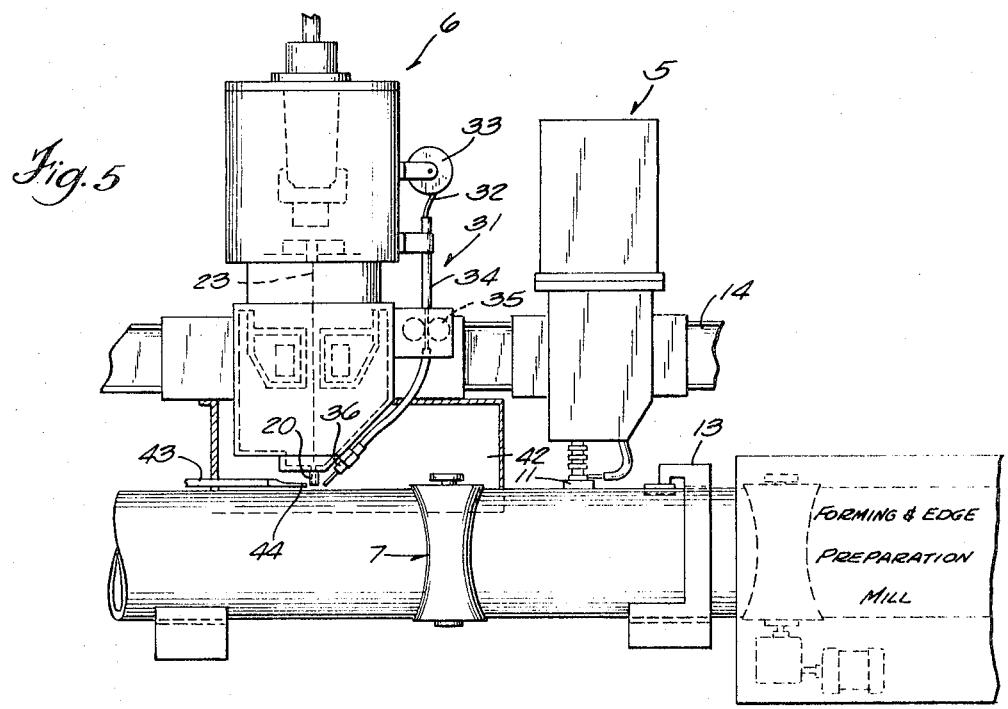
FIG. 5 is a side elevational view of an apparatus in a modified embodiment of the invention.

The illustrated apparatus for the practice of the invention may be modified to provide at least a portion of the reinforcement material by adding filler and to provide deoxidizer at the electron beam station. Wherever considered desirable to provide additional filler, the present invention may be constructed with an auxiliary filler source such as shown in FIG. 5 which is a modification of the embodiment shown in FIGS. 1—4. Similar devices in FIGS. 1—4 and 5 are numbered identically.

In the modified assembly, extra filler metal is added by a cold wire feed assembly 31 which is located between prewelding unit 5 and electron beam unit 6. Wire feed assembly 31 is shown attached to unit 6 by suitable support members.

The assembly feeds a metal filler wire 32 to what is known as the keyhole between edges 3 and 4 at the leading edge of electron beam 23. There, the high temperatures and the electron beam energy melt the end of wire 32 to thus provide reinforcement material in the desired amount to avoid undercutting. To add deoxidizer along with the filler, wire 32 can have a deoxidizing agent such as any known agent incorporated with the wire.

Wire 32 is thus a consumable member and is fed by a suitable wire feed mechanism which draws the wire from a reel 33 and threads it through a sheath 34. The wire extends between motor driven drive rolls 35 which operate to draw the wire off of reel 33 at a controlled rate. To reach the workpiece, wire 32 extends from drive rolls 35 through a nozzle 36 to the keyhole at exit orifice 20.

Where wire 32 has the deoxidizer agent, wire feed assembly 31 also supplies deoxidizer to edges 3 and 4 at the electron beam station. Primarily, however, the modified embodiment provides reinforcement material as filler where needed for addition to the reinforcement material provided by the resistance heating and pressure application at the preweld station 5.

Figure 6:
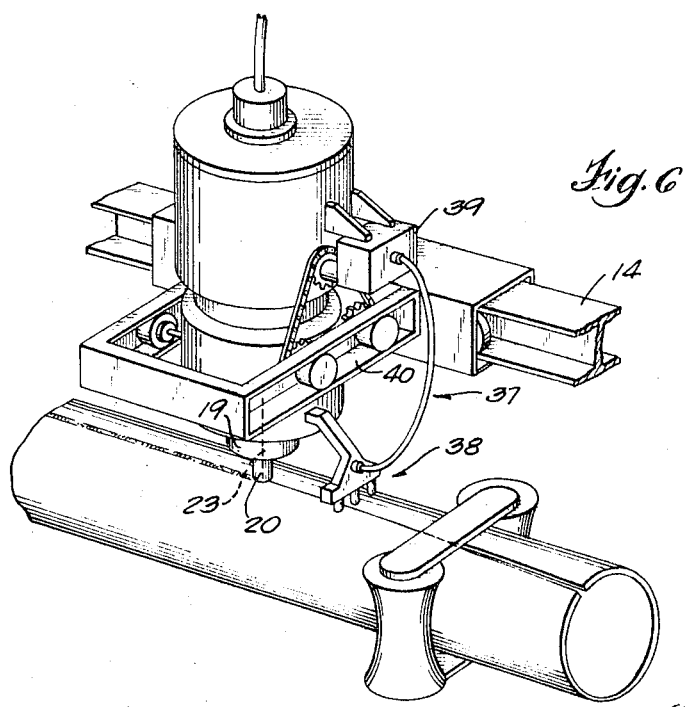
FIG. 6 is a perspective view of another modified embodiment of the invention.

A further modification of the invention is illustrated generally in FIG. 6. Similar parts are given identical numbers to those in FIGS. 1—4. In some applications of the invention such as with the illustrated apparatus for pipe seam welding, the seam preparing station 5 will cause slight lateral deflections of the seam due to such things as thermal expansion and twisting of the pipe blanks. Thus, slight lateral deviations in the position of the partially fused seam may occur and if perfection is desired, the electron beam gun 19 must be precisely focused into the proper position of the seam.

To maintain electron beam 23 in the seam as the seam varies, a follower device 37 may be incorporated in the apparatus of the invention. Shown schematically, follower 37 has a sensor transducer 38 positioned centrally over the partially fused seam, and a servocontrol 39, which receives signals from sensor 38 when the seam deviates and controls gun 19 to keep the beam properly positioned in accordance with the sensing unit signals.

In the practice of the invention with a vacuum unit, servo device 39 could control a lens to deflect the beam 23 the desired amount. However, with nonvacuum gun 19 it is advisable to construct the electron beam welding station 6 so that electron beam gun 19 is itself laterally movable as on lateral tracks 40 which are suitably secured to a beam member of frame 14. As well, electron beam gun 19 could be independently supported rather than being secured to frame 14.

Sensor 38 may be of any well-known mechanical or electrical variety such as a probe, an infrared sensor or like device and must provide a signal whenever the seam varies one way or the other. This signal is transmitted, as shown schematically, to servocontrol 39 which may be any suitable servomechanism capable of quickly driving the gun back and forth in accordance with the sensor signals.

The circuitry and other elements in servo 39 and sensor 38 may be standard systems and for that reason are not further described here.

Another modification of the invention is illustrated in FIG. 5. The length of the hot seam between preweld station 5 and electron beam station 6 is preferably minimized, but the size of the systems involved may not permit close spacing of the stations. This leaves an appreciable distance through which heated material in the seam can be oxidized or otherwise contaminated.

For these reasons, an inert gas shield 42 is provided for the invention. Shield 42 can be secured to gun 19 or to frame 14 as desired and has front, back and sidewalls depending downwardly therefrom to be slidably engaged on the lower edges of the walls with the outer surface of the pipe. Shield 42 encloses a portion of the hot seam of pipe blank 1 beyond apex 8 and extends to the opposite side of electron beam exit orifice 20. The shield may be enlarged or reduced in size as desired or permitted by the space available.

In one embodiment, inert gas such as argon or helium is supplied from a compressed gas source, not shown, to the shield through a conduit 43, terminating in a nozzle jet 44 right at orifice 20. The compressed gas purges the oxygen from the area of the heated seam and blows scraps and foreign material away from the weld. This system thus improves the uniformity and the quality of the welds provided by the process of the invention.

In another form, air can be blown through a jet 44 for purposes of blowing scraps and foreign material away from the weld. This can be done where a wire feed and deoxidizer apparatus is used, or where oxidation of the weld is no particular problem.

OVERALL OPERATION

The process of the invention is illustrated in practice with the pipe welding apparatus of the drawings. A workpiece, here being pipe blank 1, is moved relative to seam preparing station 5 and high energy beam welding station 6. In this example, the blank is passed through these stations with seam edges 3 and 4 being disposed at the top of the blank.

As blank 1 reaches pincher rollers 7, the rollers clamp edges 3 and 4 together to apex 8. At the same time heat is applied to the edges, such as by high frequency resistance heating provided from high frequency unit 15. The blank slides under electrodes 11 and, as before described, high frequency current heats edges 3 and 4 to high or fusing temperatures at apex 8. The seam has thus been prepared at station 5 and passes to station 6 with the edges joined and in a heated state. Further, rollers 9 have extruded a portion of the plastic metal from edges 3 and 4 to provide reinforcement. Reinforcement may be added by the wire feed assembly 31 as previously described in connection with FIG. 5.

At station 6, the seam and reinforcement is rewelded by activating electron beam gun 19 and directing a high energy beam 23 into the prepared seam. This process accomplishes a finished weld of high quality.

As the pipe blank passes beyond station 6, hot trim apparatus 28 puts the finishing touches on weld 2 as before described. The various modifications of the apparatus of the invention also operate as the blank moves through the stations. These have been fully described previously.

Thus, the invention is a process and an apparatus which provides high quality welds at increased operating speeds and simple operation.

The process of the invention has been described in practice with a particularly advantageous apparatus which is also contemplated by the invention. The following claims clearly define the scope of the invention.

I claim:
1. A welding process for preparing and joining abutting edges of metal members at a welding station, comprising:
   providing relative movement between the abutting edges and the welding station;
   applying heat and pressure at the abutting edges to join the edges into a weld seam with the seam being disposed in a nonfinalized state;
   developing the weld seam to provide a raised metal portion at and along the weld seam; and
   applying a high energy beam to the weld seam at such intensity to perfect a high energy beam weld between the abutting edges, with any undercutting effect appearing only in said raised metal portion at the weld seam.

2. The process of claim 1, wherein the heat applied at the abutting edges is sufficient to heat the fused weld seam to a plastic state; and the high energy beam is applied to said seam while the fused weld seam remains in a heated condition.

3. The process of claim 1, wherein the fused weld seam is developed to overflow the abutting edges by extruding metal from the edges during the application of heat and pressure.

4. The process of claim 1, wherein the fused weld seam is developed to overflow the abutting edges by providing filler material to the weld seam after the edges are joined into said fused weld seam and before applying said high energy beam.

5. The process of claim 1, wherein the reinforcement material is provided from both: material extruded from the edges during the application of heat and pressure; and from filler material added to the weld seam after the edges are joined into said fused weld seam of the edges and before applying said high energy beam.

6. The process of claim 1, wherein the heat and pressure application is accomplished by high frequency resistance welding and said high energy beam weld is accomplished by electron beam welding.